(12) United States Patent
Song et al.

(10) Patent No.: US 12,727,036 B2
(45) Date of Patent: Sep. 1, 2026

(54) RADIO UNIT MANAGEMENT DEVICE AND SYSTEM FOR CONTROLLING O-RAN RADIO UNIT AND SMART ANTENNA SYSTEM BASED ON O-RAN STANDARD, AND METHOD FOR CONTROLLING THE SAME

(71) Applicant: ADRF KOREA, Inc., Icheon-si (KR)

(72) Inventors: Jin Soo Song, Icheon-si (KR); Hyun Kyung Song, Gwangju-si (KR)

(73) Assignee: ADRF KOREA, Inc., Icheon-si (KR)

( * ) Notice: Subject to any disclaimer, the term of this patent is extended or adjusted under 35 U.S.C. 154(b) by 383 days.

(21) Appl. No.: 18/232,417

(22) Filed: Aug. 10, 2023

(65) Prior Publication Data

US 2025/0024521 A1 Jan. 16, 2025

(30) Foreign Application Priority Data

Jul. 11, 2023 (KR) ........................ 10-2023-0089595

(51) Int. Cl.
*H04W 76/10* (2018.01)
*H04W 56/00* (2009.01)
*H04W 92/12* (2009.01)

(52) U.S. Cl.
CPC ......... *H04W 76/10* (2018.02); *H04W 56/001* (2013.01); *H04W 92/12* (2013.01)

(58) Field of Classification Search
CPC ... H04W 28/10; H04L 41/0895; H01Q 1/246; H04B 1/0458; H04B 7/0802; H04B 7/0608
See application file for complete search history.

(56) References Cited

U.S. PATENT DOCUMENTS

2021/0105125 A1* 4/2021 Rajagopal ............. H04W 72/23
2021/0120104 A1* 4/2021 Al-Mufti ............. H04L 41/0806
2023/0105918 A1* 4/2023 Vagner ................ H04W 72/044 370/330
2023/0108782 A1* 4/2023 Kang .................. H04W 88/085 370/336

* cited by examiner

*Primary Examiner* — Yee F Lam
(74) *Attorney, Agent, or Firm* — Dinsmore & Shohl LLP; Yongsok Choi, Esq.

(57) ABSTRACT

A radio unit management system (RUMS) for controlling an open radio access network (O-RAN) radio unit (O-RU) based on an O-RAN standard includes a fronthaul interface connected to a fronthaul and configured to receive data transmitted and received between a plurality of O-RAN distributed units (O-DUs) and a plurality of O-RUs, and a plane information processor configured to classify U-Plane (User Plane) data, C-Plane (Control Plane) data, S-Plane (Synchronization Plane) data, and M-Plane (Management Plane) data among the data received through the fronthaul interface. The plane information processor is configured to process the C-Plane data, the S-Plane data, and the M-Plane data, and not to process the U-Plane data.

10 Claims, 5 Drawing Sheets

FIG. 5

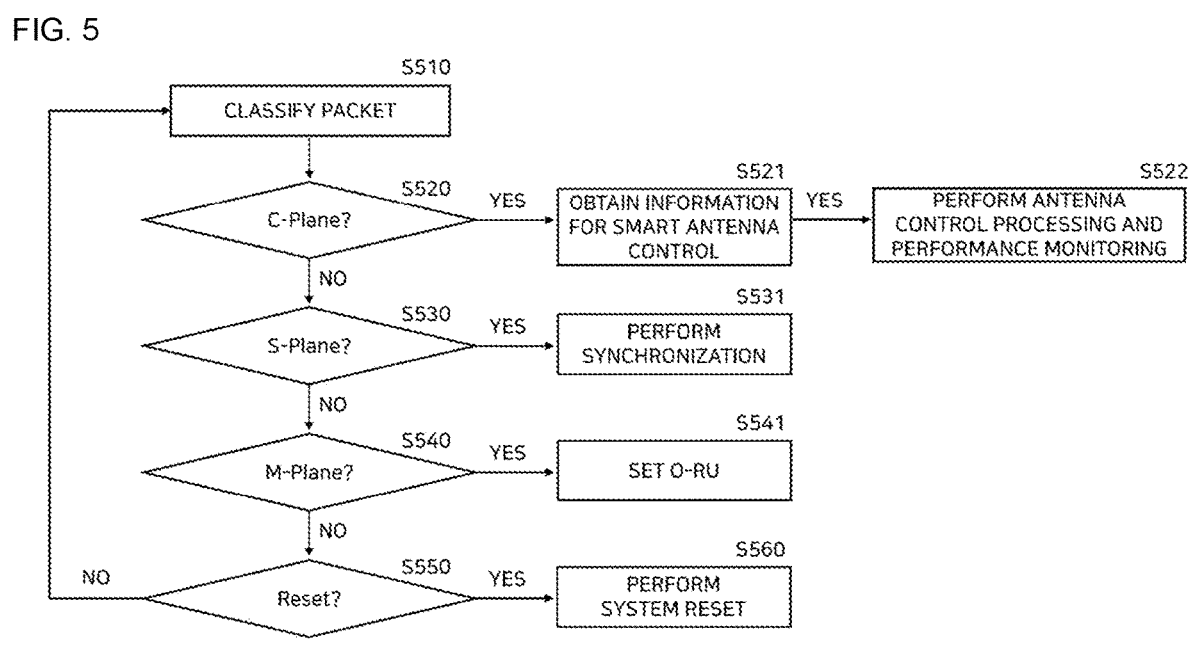

S510
CLASSIFY PACKET
S520
C-Plane?
YES
S521
OBTAIN INFORMATION FOR SMART ANTENNA CONTROL
YES
S522
PERFORM ANTENNA CONTROL PROCESSING AND PERFORMANCE MONITORING
NO
S530
S-Plane?
YES
S531
PERFORM SYNCHRONIZATION
NO
S540
M-Plane?
YES
S541
SET O-RU
NO
S550
Reset?
NO
YES
S560
PERFORM SYSTEM RESET

FIG. 6

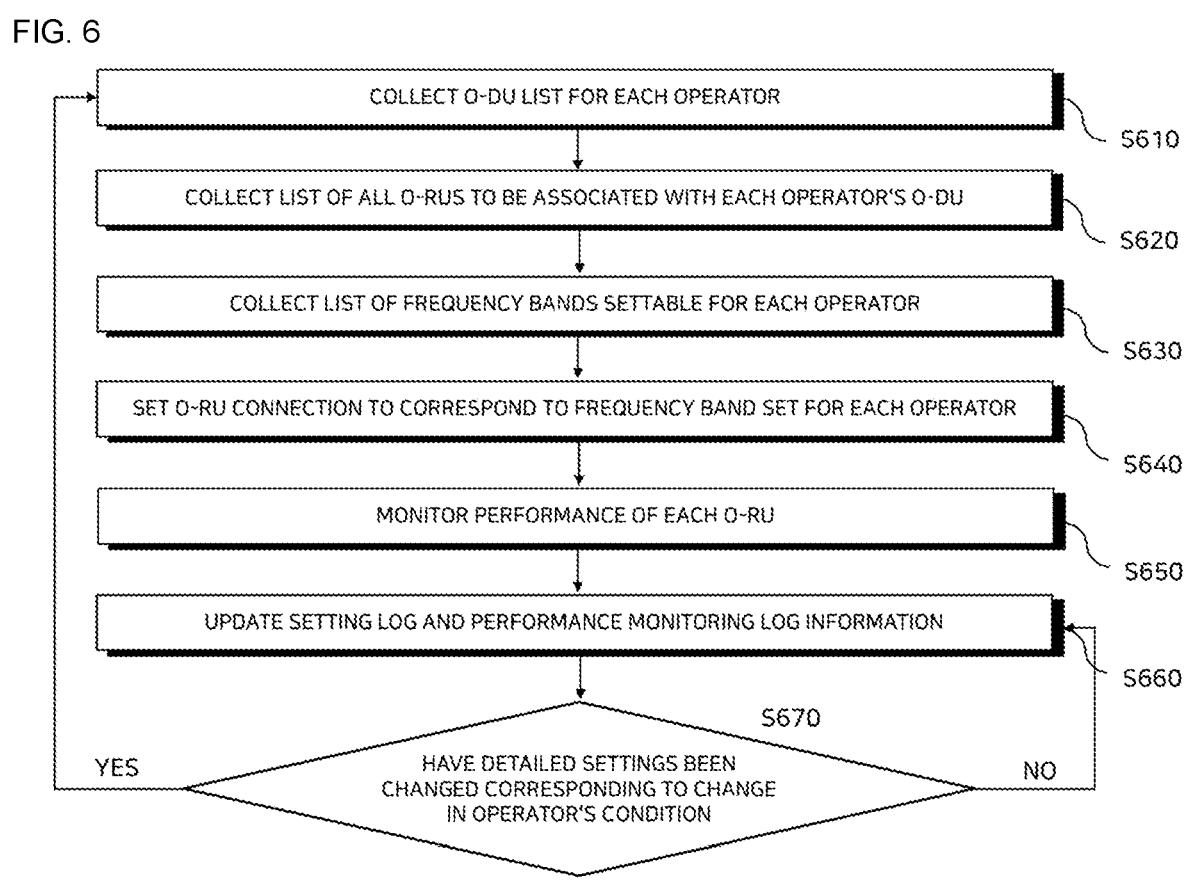

COLLECT O-DU LIST FOR EACH OPERATOR S610

COLLECT LIST OF ALL O-RUS TO BE ASSOCIATED WITH EACH OPERATOR'S O-DU S620

COLLECT LIST OF FREQUENCY BANDS SETTABLE FOR EACH OPERATOR S630

SET O-RU CONNECTION TO CORRESPOND TO FREQUENCY BAND SET FOR EACH OPERATOR S640

MONITOR PERFORMANCE OF EACH O-RU S650

UPDATE SETTING LOG AND PERFORMANCE MONITORING LOG INFORMATION S660

S670

HAVE DETAILED SETTINGS BEEN CHANGED CORRESPONDING TO CHANGE IN OPERATOR'S CONDITION

YES

NO

RADIO UNIT MANAGEMENT DEVICE AND SYSTEM FOR CONTROLLING O-RAN RADIO UNIT AND SMART ANTENNA SYSTEM BASED ON O-RAN STANDARD, AND METHOD FOR CONTROLLING THE SAME

CROSS-REFERENCE TO RELATED APPLICATION

This application claims priority to Korean Patent Application No. 10-2023-0089595 filed on Jul. 11, 2023, the entire contents of which are herein incorporated by reference.

BACKGROUND

1. Field

The disclosure relates to a radio unit management system (RUMS) for controlling an open radio access network (O-RAN) radio unit (O-RU) and a smart antenna system according to an O-RAN technical standard for building a next-generation radio infrastructure. More particularly, the disclosure relates to an RUMS capable of improving in-building coverage, reducing remote unit power, and interworking with a smart antenna system, and a method of controlling the RUMS.

2. Description of the Related Art

An open radio access network (O-RAN) standard provided under the principles of intelligence and openness is a basis for building a virtualized RAN on open hardware and in a cloud through artificial intelligence (AI)-based radio control. The O-RAN standard was created to ensure a broad vendor community driven by innovation and open market competition and also accelerate the delivery of products that support a common open architecture and standardized interfaces that we, as operators, see as the basis for next-generation wireless infrastructures.

In constructing a next-generation wireless infrastructure through the O-RAN standard, an O-RU is developed as a remote unit for a specific frequency band or specific carrier as in an existing base station system, and these products are developed and provided to the specific carrier.

However, in a market environment where a wireless infrastructure is to be built, multiple operators, multiple carriers, and multiple frequency bands need to be served simultaneously. However, in an RU structure of a conventional O-RAN system, although there is no problem in servicing a single frequency band, use in in-building distributed network structures for multiple frequency bands and multiple operators is difficult. In a conventional O-RU structure, only O-RUs inherently assigned to an O-RAN distributed unit (O-DU) can be connected, making it impossible to flexibly change a plurality of O-DUs and a plurality of O-RUs as needed and connect them to each other. Therefore, a new radio unit management system (RUMS) capable of controlling an O-RU and a smart antenna system to integrate and accommodate multiple modulation schemes, multiple carriers, multiple frequency bands, and multiple channels is required.

SUMMARY

Provided is a radio unit management system (RUMS) capable of controlling an O-RU and a smart antenna system to integrate and accommodate multiple modulation schemes, multiple carriers, multiple bands, and multiple channels. The multiple bands refer to two or more frequency bands, and the multiple channels refer to one or more outputs to an antenna system.

Provided is an RUMS that enables indoor signal coverage expansion while maintaining compatibility with a partitioned and virtualized O-RAN radio transmission system.

Provided is an RUMS that enables use of a plurality of operators and a plurality of bands and a plurality of channels for each operator while complying with an O-RAN standard, and is essential for constructing a cost-effective distributed antenna system (DAS) architecture.

Provided is an RUMS capable of efficiently controlling a smart antenna of an O-RU having an antenna-separated smart antenna system structure rather than an antenna-integrated O-RU.

Provided is an RUMS that allows an O-RAN system to be operated more flexibly and efficiently in an enterprise network environment that integrates and accommodates multiple operators and multiple bands.

The technical problems of the disclosure are not limited to the above-mentioned contents, and other technical problems not mentioned will be clearly understood by a person skilled in the art from the following description.

According to an embodiment of the disclosure, a radio unit management system (RUMS) for controlling an open radio access network (O-RAN) radio unit (O-RU) based on an O-RAN standard includes a fronthaul interface connected to a fronthaul and configured to receive data transmitted and received between a plurality of O-RAN distributed units (O-DUs) and a plurality of O-RUs, and a plane information processor configured to classify U-Plane (User Plane) data, C-Plane (Control Plane) data, S-Plane (Synchronization Plane) data, and M-Plane (Management Plane) data among the data received through the fronthaul interface. The plane information processor is configured to process the C-Plane data, the S-Plane data, and the M-Plane data, and not to process the U-Plane data.

The fronthaul interface may include an optical module for transmitting and receiving the M-Plane data for associating an individual O-RU with each O-DU of a plurality of operators.

The plane information processor may include an M-Plane processor configured to establish a connection between each of the plurality of O-RUs and an O-DU of each of the plurality of operators by using the M-Plane data transmitted and received between the plurality of O-DUs and the plurality of O-RUs.

The M-Plane processor may be further configured to collect information related to frequency bands settable for each operator and change settings of each O-RU to be suitable for each operator's frequency band.

The plane information processor may include an S-Plane processor configured to perform synchronization by using the S-Plane data transmitted and received between the plurality of O-DUs and the plurality of O-RUs.

The plane information processor may include a C-Plane processor configured to perform smart antenna control processing and performance monitoring of each O-RU by using the C-Plane data transmitted and received between the plurality of O-DUs and the plurality of O-RUs.

The O-RU may include an O-RU digital part and one or more smart antenna modules. The O-RU digital part may include a fronthaul transport layer configured to transmit and receive a signal to and from a O-DU, a low physical layer configured to process a signal according to an O-RAN division standard received through the fronthaul transport layer, a digital front end (DFE) configured to perform digital-to-analog conversion on a signal transmitted by the low physical layer, and a first radio frequency (RF) interface configured to transmit and receive a signal to and from the smart antenna module. Each of the one or more smart antenna modules may include a second RF interface configured to transmit and receive a signal to and from the O-RU digital part, and a radio frequency front end (RF FE) connected between one or more antennas and the second RF interface and configured to process an RF signal. The first RF interface and the second RF interface may be connected by a transmission line.

The RUMS may further include a wireless communication interface for transmitting and receiving M-Plane data to and from the smart antenna module through wireless communication.

The RUMS may further include a smart antenna manager configured to perform antenna setting and performance monitoring through the smart antenna module.

The smart antenna manager may include a power amplifier controller for controlling a power amplifier built in an antenna, and a routing controller controlled by a reconfigurable parameter in a field and configured to process connection (routing) between the plurality of O-DUs and the plurality of O-RUs according to operators and frequency bands.

DESCRIPTION OF THE DRAWINGS

These and/or other aspects will become apparent and more readily appreciated from the following description of the embodiments, taken in conjunction with the accompanying drawings in which:

FIG. 5 is a flowchart of a method, performed by a RUMS, of processing plane data, according to an embodiment of the disclosure; and FIG. 6 is a method, performed by an RUMS, of processing a connection between an O-DU corresponding to each operator and each O-RU, according to an embodiment of the disclosure.

DETAILED DESCRIPTION

Figure 1:
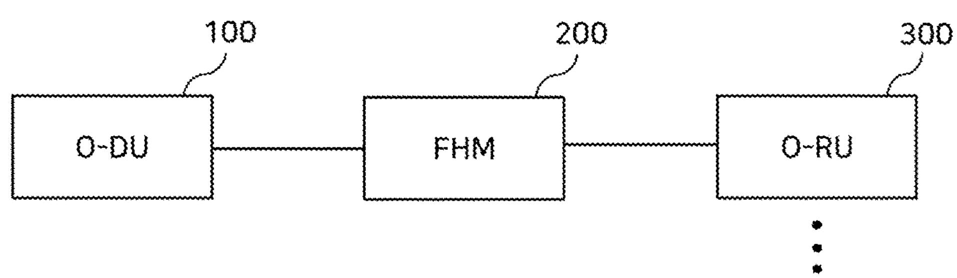
FIG. 1 is a block diagram of a connection structure of a conventional open radio access network (O-RAN) distributed unit (DU) (O-DU) and a conventional O-RAN radio unit (RU) (O-RU)

Embodiments of the disclosure will now be described more fully with reference to the accompanying drawings such that one of ordinary skill in the art to which the disclosure pertains may easily execute the disclosure. The disclosure may, however, be embodied in many different forms and should not be construed as being limited to the embodiments set forth herein. In the drawings, elements irrelevant to the descriptions of the disclosure are omitted to clearly explain embodiments of the disclosure.

The terms used in the present specification are merely used to describe particular embodiments, and are not intended to limit the disclosure. An expression used in the singular may encompass the expression of the plural, unless it has a clearly different meaning in the context.

In the present specification, it may be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, the components shown in the embodiments of the disclosure are shown independently to indicate different characteristic functions, and do not mean that each component is separate hardware or one software component. In other words, for convenience of description, each component is listed and described as each component, and at least two components of each component may be combined to form one component, or one component may be divided into a plurality of components to perform a function. The integrated and separate embodiments of each component are also included in the scope of the disclosure without departing from the essence of the disclosure.

Hereinafter, the disclosure will be described more fully with reference to the accompanying drawings, in which embodiments of the disclosure are shown.

FIG. 1 is a block diagram of a connection structure of a conventional open radio access network (O-RAN) distributed unit (DU) (O-DU) and a conventional O-RAN radio unit (RU) (O-RU).

Referring to FIG. 1, an O-DU 100 may be connected to a plurality of O-RUs 300 through a fronthaul multiplexer (FHM) 200 disposed in a fronthaul. In this case, because the O-DU 100 is separately operated for each operator, only the plurality of O-RUs 300 inherently assigned to the O-DU 100 may be connected to the O-DU 100.

Due to such a structure, the conventional O-RU 300 is configured to be suitable for supporting a service of a single frequency band or a single operator, and thus is integrated with an antenna. Because an antenna module for RF signal processing is embedded in an O-RU as described above, an O-RU for each frequency band or each operator need to be installed. Thus, a plurality of O-RUs need to be installed to provide a service that supports multiple frequency bands and multiple operators. This causes a lot of cost.

Figure 2:
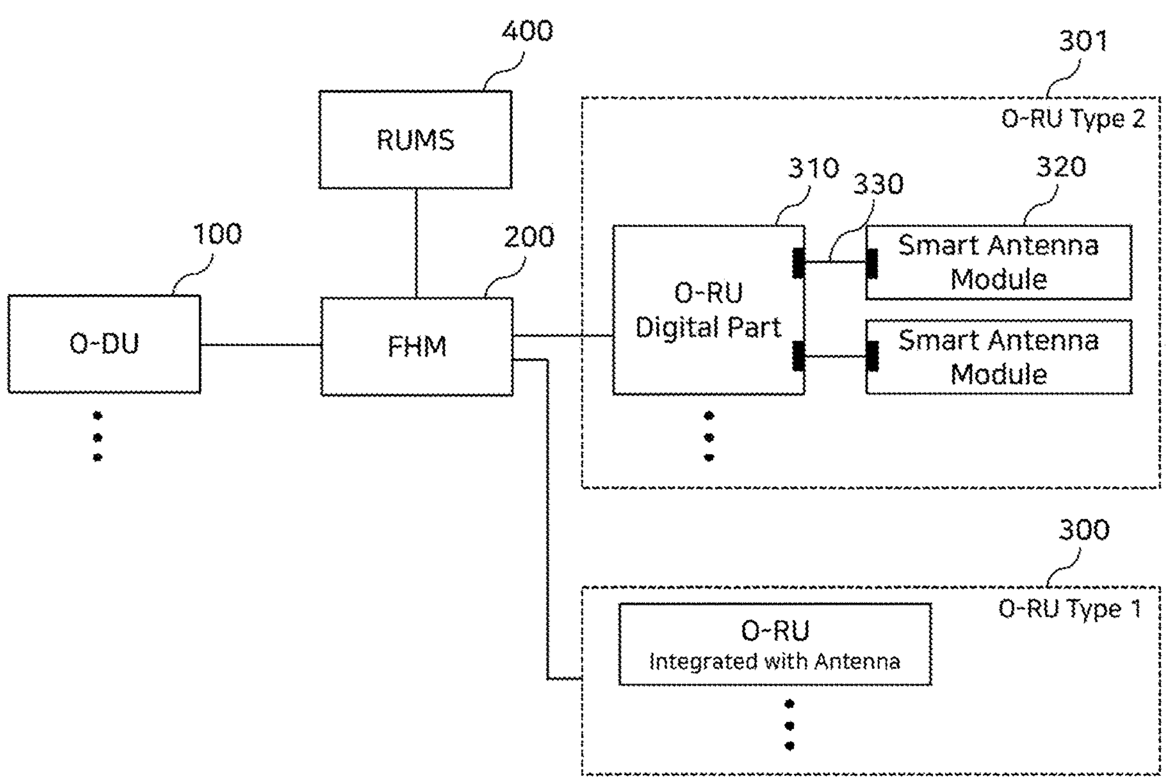
FIG. 2 is a block diagram for explaining a system to which a radio unit management system (RUMS) is connected in an enterprise environment having a plurality of O-DUs and a plurality of O-RUs, according to an embodiment of the disclosure.

FIG. 2 is a block diagram for explaining a system to which a radio unit management system (RUMS) is connected in an enterprise environment having a plurality of O-DUs and a plurality of O-RUs, according to an embodiment of the disclosure.

Referring to FIG. 2, an RUMS 400 may be connected to a fronthaul, which is an interface between the O-DU 100 and O-RUs 300 and 301, through the FHM 200. The RUMS 400 may be connected to the O-RU 300 of type 1, which is a conventional antenna-integrated type, and the O-RU 301 of type 2, in which an O-RU digital part 310 and a smart antenna module 320 are separated from each other, and may be configured to integrally control, particularly, the O-RU 301 of type 2 having a smart antenna system structure.

Each O-RU 301 having a smart antenna system structure may include an O-RU digital part 310, one or more smart antenna modules 320, and a transmission line 330 connecting the O-RU digital part 310 to the smart antenna module 320. A detailed configuration of the O-RU 301 will be described later with reference to FIG. 4.

The RUMS 400 disposed on a fronthaul data transmission/reception network between the O-DU 100 and the O-RU 301 as described above is configured to identify the O-DU of each of multiple operators and manage O-DU allocation with respect to an O-RU and a smart antenna system which are to be controlled, in order to achieve multi-operator and multi-band correspondence. Allocation of several O-DUs 100 to one O-RU 301 and a smart antenna connected to the one O-RU 301 may be controlled through SHARED-ORU-MULTI-OPERATOR and SHARED-ORU-MULTI-ODU functions of an O-RAN M-Plane standard, and thus multiple operators may be integrally accommodated.

This may be implemented through only one physical connection, and the physical connection may be controlled through a logical connection conducted in an application protocol layer of a TCP/IP protocol based on an M-Plane/YANG Model between a plurality of O-DUs 100 and a plurality of O-RUs 301. In an enterprise network environment that integrally accommodates multiple operators and multiple bands, detailed settings of the RUMS 400 may be controlled by a web program using a web user interface. A description of each component of the RUMS 400 will be described below.

Figure 3:
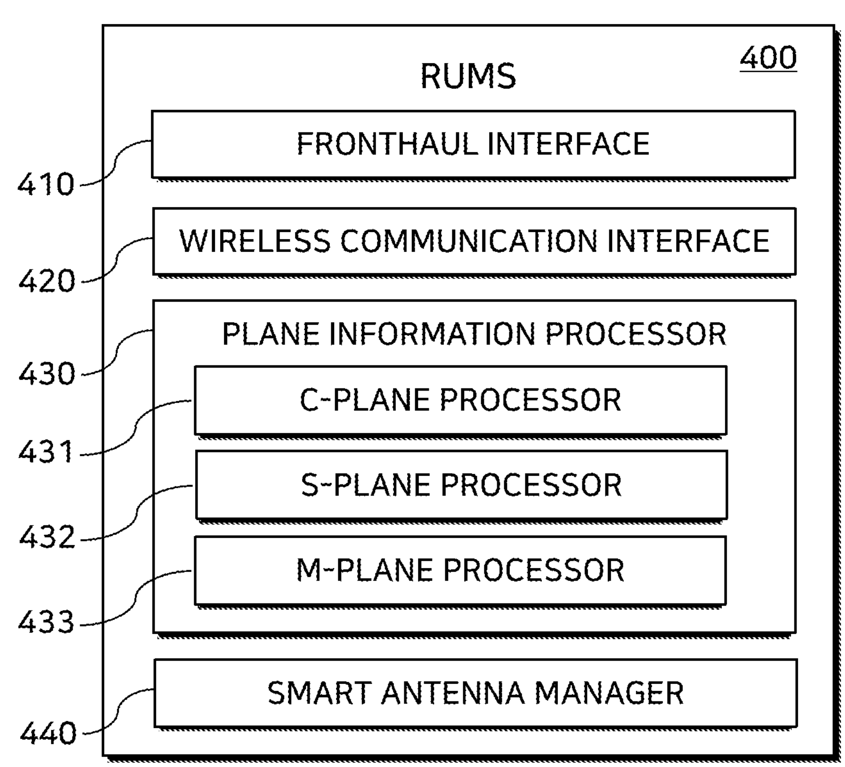
FIG. 3 is a block diagram of a structure of an RUMS according to an embodiment of the disclosure.

FIG. 3 is a block diagram of a structure of the RUMS 400 according to an embodiment of the disclosure.

An O-RAN-based radio access network has evolved into virtualized network functions (NF) by using virtualization and segmentation technology, and these virtualized NFs may be mainly implemented in the form of software to be freely expanded or reduced according to service requirements or network load, and operates according to reset, startup, configuration, performance monitoring & software update, and network automation that ends. The RUMS 400, which is a type of NF, is basically driven on a physical configuration such as equipment even when several embodiments are implemented in the form of software, and the RUMS 400 may be implemented only using hardware. The RUMS 400 may include a memory and a processor, and the memory may store instructions that constitute a process executed by the processor.

The RUMS 400 may include a fronthaul interface 410, a wireless communication interface 420, a plane information processor 430, and a smart antenna manager 440, but embodiments of the present disclosure are not limited thereto.

The fronthaul interface 410 is connected to a fronthaul to receive data transmitted and received between the plurality of O-RAN DUs 100 and the plurality of O-RAN RUs 300 and 301, and may be connected to the FHM 200. The fronthaul interface 410 may include an optical module to transmit and receive M-Plane data, C-Plane data, S-Plane data, and the like for connecting an individual O-RU 301 to each O-DU 100 of a plurality of operators, and may include, for example, SFP, SFP+, and QSFP modules.

The wireless communication interface 420 is configured to transmit and receive a signal of the M-Plane data to and from the smart antenna module 320 through wireless communication in order to efficiently control the smart antenna system of the O-RU 301. This enables the smart antenna module 320 to be controlled.

The plane information processor 430 may be configured to classify U-Plane (User Plane) data, C-Plane (Control Plane) data, S-Plane (Synchronization Plane) data, and M-Plane (Management Plane) data among the data received through the fronthaul interface 410, and may be configured to process the C-Plane data, the S-Plane data, and the M-Plane data and not process the U-Plane data.

A C-Plane processor 431 may be configured to perform smart antenna control processing and performance monitoring of each O-RU 301 by using the C-Plane data transmitted and received between the plurality of O-DUs 100 and the plurality of O-RUs 301.

An S-Plane processor 432 may be configured to perform synchronization by using the the S-Plane data transmitted and received between the plurality of O-DUs 100 and the plurality of O-RUs 301.

An M-Plane processor 433 may be configured to set connection of each O-RU with an O-DU of each operator by using the M-Plane data transmitted and received between the plurality of O-DUs 100 and the plurality of O-RUs 301. In this case, the M-Plane processor 433 may be configured to collect information related to a frequency band settable for each operator and change the settings of each O-RU to suit the frequency band of each operator. A method of processing connection between an O-DU and each O-RU as described above will be described in more detail with reference to FIG. 6.

Next, the smart antenna manager 440 may be configured to perform setting and performance monitoring of each antenna through the smart antenna module 320 of the O-RU 301. The smart antenna manager 440 may include a power amplifier controller configured to perform power control and processing of a smart antenna by using the M-Plane data in order to control a power amplifier included in the smart antenna module 320, and a routing controller controlled by a reconfigurable parameter in a field and configured to process connection (routing) between O-DUs in a multi-operator environment and a plurality of O-RUs installed in an enterprise environment according to operators and frequency bands, namely, to perform a matching operation between an O-DU and an O-RU.

Figure 4:
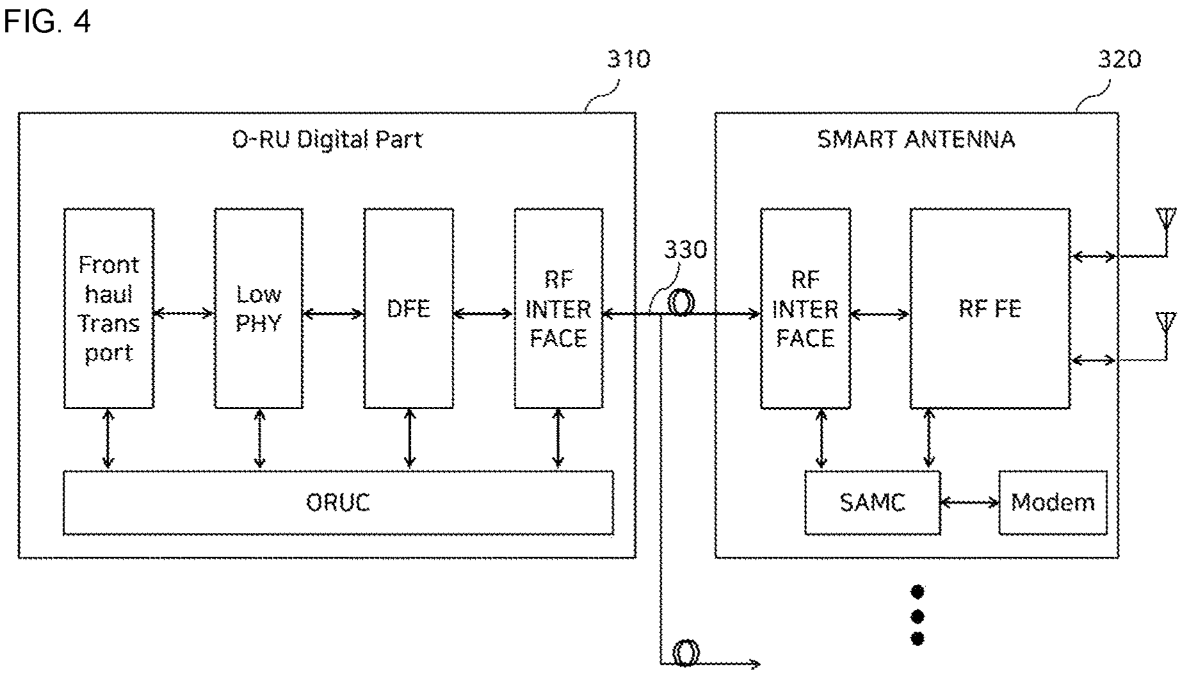
FIG. 4 is a block diagram of a structure of an O-RU in which an O-RU digital part and a smart antenna module are separated from each other, according to an embodiment of the disclosure.

FIG. 4 is a block diagram of a structure of an O-RU in which an O-RU digital part and a smart antenna module are separated from each other, according to an embodiment of the disclosure.

Referring to FIG. 4, an O-RU digital part 310 and a smart antenna module 320 may be separated from each other to be suitable for an in-building distributed network structure for accommodating multiple frequency bands and multiple operators, and the smart antenna module 320 may be connected to an external antenna to enable a service. A plurality of smart antenna modules 320 are included to support multiple frequency bands and multiple operators. The O-RU digital part 310 may include an O-RU controller (ORUC) for controlling the O-RU digital part 310, the smart antenna module 320 may include a smart antenna module controller (SAMC) for controlling the smart antenna module 320, and the ORUC and the SAMC may be configured to communicate with each other.

Looking at the configuration of the O-RU digital part 310 in more detail, a fronthaul transport layer is configured to transmit and receive signals to and from a DU. For example, a downlink signal input through an enhanced common public radio interface (eCPRI) in an O-DU extracts an IEEE 1588 synchronization signal from a signal transmitted to the fronthaul transport layer, and the downlink signal may be transmitted to a low physical layer (Low PHY).

The low physical layer is configured to process a signal according to an O-RAN division 7.2× standard received through the fronthaul transport layer, and the low physical layer converts the received downlink signal into a baseband signal by using an FPGA or ASIC and transmits the baseband signal to a digital front end (DFE). At this time, an uplink signal may transmit a signal input through the DFE to the fronthaul transport layer through the low physical layer. In the low physical layer, for example, FFT/IFFT of signals, cycle prefix (CP) addition and removal, and a physical random access channel (PRACH) function may be performed.

The DFE may be configured to perform digital-to-analog conversion on the signal transmitted by the low physical layer, and may transmit an input signal to a first radio frequency (RF) interface for transmitting an RF signal having undergone digital-to-analog conversion through a digital down converter (DDC) to the smart antenna module 320 through a transmission line 330 such as an optical cable, a coaxial cable, or an Ethernet cable. The uplink signal may undergo analog-to-digital conversion through a digital up converter (DUC) and may be input to the DFE.

The first RF interface of the O-RU digital part 310 is a component for transmitting and receiving signals to and from the smart antenna module 320, and may be implemented as an optical interface, a coaxial cable interface, an Ethernet interface, or the like. The first RF interface of the O-RU digital part 310 and a second RF interface of the smart antenna module 320 may be connected to each other through the transmission line 330 that may be implemented as an optical cable, a coaxial cable, an Ethernet cable, or the like.

Regarding the smart antenna module 320, the second RF interface may be configured to transmit and receive signals to and from the O-RU digital part 310, and an RF FE may be connected between one or more external antennas and the second RF interface to process an RF signal.

In this case, a downlink signal transmitted to the smart antenna module 320 through the second RF interface may be amplified through a high power amplifier (AMP) and processed through a circulator and a band pass filter (BPF) to the antenna 230 through the RF FE. In case of an uplink signal, a signal input through the antenna is input so that only a desired signal band is input through the BPF, a downlink signal and an uplink signal are separated from each other through the circulator, and a signal obtained by processing the uplink signal through a low noise amplifier may be transmitted to the DFE of the O-RU digital part 310.

According to the disclosure, a plurality of smart antenna modules 320 may be physically located apart from one another. In this case, an output quality of the plurality of smart antenna modules 320 may be stably maintained by adjusting a signal strength of a smart antenna module 320 at each location through output level and gain control of the SAMC.

The smart antenna module 320 may be configured to perform wireless communication with the wireless communication interface 420 of the RUMS 400 through a separate wireless modem, and thus may transmit and receive an antenna control signal and an antenna performance monitoring related signal between the RUMS 400 and the smart antenna module 320.

FIG. 5 is a flowchart of a method, performed by a RUMS, of processing plane data, according to an embodiment of the disclosure.

Referring to FIG. 5, the RUMS 400 may classify and process data packets transmitted and received between a plurality of O-DUs and a plurality of O-RUs of multiple operators through the plane information processor 430, and may first classify a packet received from the fronthaul (S510). The plane information processor 430 is configured not to process U-Plane packets corresponding to real data exchanged between a base station and user equipment among U-Plane, C-Plane, S-Plane, and M-Plane packets that are transmitted and received.

When it is determined in S520 that the classified packet is a C-Plane packet, information for smart antenna control may be obtained and collected from the C-Plane packet (S521), and antenna control processing and performance monitoring may be performed using the collected information (S522).

When it is determined in S530 that the classified packet is an S-Plane packet, the S-Plane packet for synchronization processing between an O-DU and an O-RU is classified, inspected, and monitored to check whether synchronization processing and synchronization have been normally performed, and a result of the checking may be managed as a log (S531).

After determining whether the classified packet is an M-Plane packet (S540), the O-RU may be set (S541). For example, the O-RU 300 of type 1, namely, an antenna-embedded type, may transmit M-Plane information through the fronthaul interface, and the O-RU 301 of type 2 having a smart antenna system may directly perform wireless communication with the smart antenna module 320 by using the fronthaul interface 410 of the RUMS 400 or the wireless communication interface 420 in order to control and monitor the smart antenna. In multi-operator and multi-band environments, main function processing of the RUMS 400 for performing basic setting and performance monitoring with respect to each O-RU is accomplished through M-Plane data processing in order to operate each O-RU in conjunction with each operator.

In more detail, O-RU configuration through M-Plane may be processed using a SHARED-ORU-MULTI-OPERATOR function included in an O-RAN-WG4-FEATURES YANG model of O-RAN M-Plane Specification 11.0 or later. In this case, because the O-RU supporting the SHARED-ORU-MULTI-OPERATOR function may also support the SHARED-ORU-MULTI-ODU function, these functions may be applied simultaneously. Accordingly, the RUMS 400 may connect O-DUs and O-RUs belonging to different operators to each other. Because the RUMS 400 is able to process information collection and configuration with respect to several O-DUs and several O-RUs in parallel through the Netconf logical connection of several concurrent sessions through the fronthaul interface 410, high-speed configuration and monitoring are possible.

Finally, it is determined whether the classified packet is a reset signal (S550), and, when the classified packet is a reset signal, a system reset may be performed (S560), and when the classified packet is not a reset signal, the packet classification may be repeatedly performed.

FIG. 6 is a flowchart of a method, performed by an RUMS, of processing a connection between an O-DU corresponding to each operator and each O-RU, according to an embodiment of the disclosure.

Referring to FIG. 6, first, an O-DU list may be collected for each operator in the multi-operator environment, and the O-DU list may be collected whenever the multi-operator environment changes (S610).

After initial collection of a list of all O-RUs to be associated with each operator's O-DU, the latest status of the O-RU list may be updated by regularly monitoring whether or not an O-RU is added (S620).

Information about the allowable range of frequency bands settable for each operator and an actual frequency band desired to be set may be collected (S630).

Connection setting of the O-RU may be changed so that the O-RU may be linked according to a frequency band set for each operator (S640). At this time, the O-RU configuration change is notified to each O-DU.

Whether the O-RU has been correctly linked with each of the O-DUs of the multiple operators and whether the O-RU operates normally without any errors, namely, performance, may be continuously monitored (S650).

Both a log for changes in setting values made during an operation of the RUMS 400 and logs related to performance monitoring may be updated (S660).

While update of the setting log and performance monitoring log is being continued, it is checked whether an operator's condition has changed (S670). When the operator's condition is changed, the above process can be repeated.

Conventional O-RAN-based radio access networks are efficient in performing outdoor services, but when conventional O-RAN-based radio access networks are applied to in-building distributed antenna systems, there are many realistic limitations in terms of O-DU installation costs and operating costs due to coverage limitations, latency problems, transmission rate degradation, and increases in radio unit (RU) manufacturing costs. An O-RAN-based smart antenna system including an RUMS according to the disclosure enables the implementation of a distributed adaptive smart antenna system, thereby significantly improving communication efficiency and throughput with the same installation costs and the same operating costs through expanding a coverage, enabling low delay, improving a transmission speed, and reducing the costs of manufacturing an RU.

By using the RUMS according to the disclosure, improvements in performance indices, such as traffic throughput improvement, terminal power saving, and user experience maximization, in an environment including a smart antenna system capable of measuring and predicting communication load, user traffic amount, traffic type, etc. in a wireless transmission/reception section under an in-building network environment where it may be difficult to secure a coverage.

The effects of the disclosure are not limited to the above-mentioned contents, and other effects not mentioned will be clearly understood by a person skilled in the art from the following description.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A radio unit management system (RUMS) for controlling an open radio access network (O-RAN) radio unit (O-RU) based on an O-RAN division standard, the RUMS comprising:

a fronthaul interface connected to a fronthaul and configured to receive data transmitted and received between a plurality of O-RAN distributed units (O-DUs) and a plurality of O-RUs; and a plane information processor configured to classify U-Plane (User Plane) data, C-Plane (Control Plane) data, S-Plane (Synchronization Plane) data, and M-Plane (Management Plane) data among the data received through the fronthaul interface, wherein the plurality of O-RUs include at least one first type O-RU integrated with antenna and a plurality of second type O-RUs each including a O-RU digital part and a plurality of smart antenna modules separated from the O-RU digital part such that the plurality of smart antenna modules accommodate a plurality of frequency bands and a plurality of operators, wherein the plane information processor is configured to process the C-Plane data, the S-Plane data, and the M-Plane data, and not to process the U-Plane data, wherein the plan information processor is configured to:

collect a list of the plurality of O-DUs associated with the plurality of operators, collect a list of frequency bands settable for the plurality of operators, and change a connection setting of the plurality of second type O-RUs based on the list of frequency bands, and wherein based on determination that the data received through the fronthaul interface is classified as an M-Plane data packet, the RUMS is configured to transmit M-Plane information of the M-Plane data packet to the at least one first type O-RU through the fronthaul interface, and transmit M-Plane information of the M-Plane data packet directly and wirelessly to the smart antenna modules of one of the plurality of second type O-RUs.

2. The RUMS of claim 1, wherein the fronthaul interface comprises an optical module for transmitting and receiving the M-Plane data for associating an individual O-RU with each O-DU of a plurality of operators.

3. The RUMS of claim 1, wherein the plane information processor comprises an M-Plane processor configured to establish a connection between each of the plurality of O-RUs and an O-DU of each of a plurality of operators by using the M-Plane data transmitted and received between the plurality of O-DUs and the plurality of O-RUs.

4. The RUMS of claim 3, wherein the M-Plane processor is further configured to collect information related to frequency bands settable for each operator and change settings of each O-RU to be suitable for each operator's frequency band.

5. The RUMS of claim 1, wherein the plane information processor comprises an S-Plane processor configured to perform synchronization by using the S-Plane data transmitted and received between the plurality of O-DUs and the plurality of O-RUs.

6. The RUMS of claim 1, wherein the plane information processor comprises a C-Plane processor configured to perform smart antenna control processing and performance monitoring of each O-RU by using the C-Plane data transmitted and received between the plurality of O-DUs and the plurality of O-RUs.

7. The RUMS of claim 1, wherein the O-RU digital part comprises:

a fronthaul transport layer configured to transmit and receive a signal to and from the plurality of O-DUS;

a low physical layer (Low PHY) configured to process a signal according to the O-RAN division standard received through the fronthaul transport layer;

a digital front end (DFE) configured to perform digital-to-analog conversion on a signal transmitted by the low physical layer; and a first radio frequency (RF) interface configured to transmit and receive a signal to and from the plurality of smart antenna modules, each of the plurality smart antenna modules comprises:

a second RF interface configured to transmit and receive a signal to and from the O-RU digital part; and a radio frequency front end (RF FE) connected between one or more antennas and the second RF interface and configured to process an RF signal, and the first RF interface and the second RF interface are connected to each other by a transmission line.

8. The RUMS of claim 7, further comprising a wireless communication interface for transmitting and receiving the M-Plane data to and from the plurality of smart antenna modules through wireless communication.

9. The RUMS of claim 7, further comprising a smart antenna manager configured to perform antenna setting and performance monitoring through the plurality of smart antenna modules.

10. The RUMS of claim 9, wherein the smart antenna manager comprises:

a power amplifier controller for controlling a power amplifier built in an antenna; and a routing controller controlled by a reconfigurable parameter in a field and configured to process connection (routing) between the plurality of O-DUs and the plurality of O-RUs according to operators and frequency bands.

* * * * *